(12) United States Patent
Ober (10) Patent No.: US 8,868,846 B2
(45) Date of Patent: Oct. 21, 2014

(54) METHOD AND SYSTEM FOR MAINTAINING DATA COHERENCY ACROSS A NETWORK

(75) Inventor: Robert E. Ober, San Jose, CA (US)

(73) Assignee: Netapp, Inc., Sunnyvale, CA (US)

( * ) Notice: Subject to any disclaimer, the term of this patent is extended or adjusted under 35 U.S.C. 154(b) by 224 days.

(21) Appl. No.: 12/981,181

(22) Filed: Dec. 29, 2010

(65) Prior Publication Data

US 2011/0231615 A1    Sep. 22, 2011

Related U.S. Application Data

(60) Provisional application No. 61/315,528, filed on Mar. 19, 2010.

(51) Int. Cl.
*G06F 12/08* (2006.01)
*G06F 12/16* (2006.01)
*H04L 29/08* (2006.01)
*H04L 12/861* (2013.01)

(52) U.S. Cl.
CPC ........ *G06F 12/0868* (2013.01); *H04L 67/1097* (2013.01); *H04L 49/90* (2013.01); *H04L 49/9073* (2013.01); *H04L 67/289* (2013.01); *H04L 67/2842* (2013.01); *G06F 2212/264* (2013.01)
USPC ................... 711/142; 711/162; 711/E12.026; 711/E12.103; 711/141

(58) Field of Classification Search
USPC ................... 711/142, 162, E12.026, E12.103
See application file for complete search history.

(56) References Cited

U.S. PATENT DOCUMENTS

| 5,802,578 | A | 9/1998 | Lovett |
| 6,516,344 | B1 | 2/2003 | Nazari |
| 6,925,533 | B2 | 8/2005 | Lewis |
| 7,120,673 | B2 | 10/2006 | Kitamura et al. |
| 7,356,581 | B2 | 4/2008 | Hashimoto |
| 7,552,197 | B2 | 6/2009 | Soltis |
| 7,688,867 | B1 | 3/2010 | Kizhepat |
| 7,721,144 | B2 | 5/2010 | Brown et al. |
| 7,769,959 | B2 * | 8/2010 | Van Doren et al. ........... 711/143 |
| 8,090,914 | B2 * | 1/2012 | Tierney et al. ............... 711/145 |
| 8,145,847 | B2 * | 3/2012 | Van Doren et al. ........... 711/141 |
| 2005/0160231 | A1 * | 7/2005 | Doren et al. .................. 711/141 |
| 2005/0160233 | A1 * | 7/2005 | Van Doren et al. ........... 711/143 |
| 2005/0160237 | A1 * | 7/2005 | Tierney et al. ............... 711/145 |
| 2006/0248292 | A1 | 11/2006 | Suresh |
| 2007/0198710 | A1 | 8/2007 | Gopalakrishnan |
| 2009/0043971 | A1 * | 2/2009 | Kim .............................. 711/150 |
| 2010/0100681 | A1 * | 4/2010 | Hayter et al. ................ 711/119 |
| 2011/0082904 | A1 * | 4/2011 | Ebbes et al. .................. 709/205 |

FOREIGN PATENT DOCUMENTS

WO    2009109535    11/2009

* cited by examiner

*Primary Examiner* — Mardochee Chery
(74) *Attorney, Agent, or Firm* — Haynes and Boone, LLP (57) ABSTRACT

Disclosed is a coherent storage system. A network interface device (NIC) receives network storage commands from a host. The NIC may cache the data to/from the storage commands in a solid-state disk. The NIC may respond to future network storage command by supplying the data from the solid-state disk rather than initiating a network transaction. Other NIC's on other hosts may also cache network storage data. These NICs may respond to transactions from the first NIC by supplying data, or changing the state of data in their caches.

17 Claims, 6 Drawing Sheets

METHOD AND SYSTEM FOR MAINTAINING DATA COHERENCY ACROSS A NETWORK

CROSS-REFERENCE TO RELATED APPLICATIONS

This application is based upon and claims priority to U.S. provisional application Ser. No. 61/315,528, filed Mar. 19, 2010, by Robert Ober, entitled "Remote Storage Caching." This application is related to U.S. application Ser. No. 12/981,294, filed the same day as the present application, by Robert Ober, Bret Weber and Bob Warren, entitled "Remote Storage Caching." The entire content of both applications is specifically incorporated herein by reference for all that it discloses and teaches.

BACKGROUND OF THE INVENTION

Mass storage systems continue to provide increased storage capacities to satisfy user demands. Photo and movie storage, and photo and movie sharing are examples of applications that fuel the growth in demand for larger and larger storage systems.

A solution to these increasing demands is the use of arrays of multiple inexpensive disks that are accessed via a network. These arrays (which may also be known as storage servers) may be configured in ways that provide redundancy and error recovery without any loss of data. Accessing these arrays via a network allows centralized management and improved resource optimization. These arrays may also be configured to allow "hot-swapping" which allows a failed disk to be replaced without interrupting the storage services of the array. Whether or not any redundancy is provided, these arrays are commonly referred to as redundant arrays of independent disks (or more commonly by the acronym RAID).

SUMMARY OF THE INVENTION

An embodiment of the invention may therefore comprise a method of maintaining storage data coherency across a network, comprising: receiving, from a first host, a first read from network storage command associated with a first block of data; in response to the first read from network storage command, determining whether said first block of data requested by said first read from network storage command is cached by a second host; in response to determining said first block of data is cached by said second host, causing said second host to write said first block of data; and, receiving at said first host, said first block of data.

An embodiment of the invention may therefore further comprise a method of maintaining storage data coherency across a storage area network, comprising: receiving, from a first host, at a master storage server, via said storage area network, a first request to change a first MESI state of a block of data; sending, to a second host, by the master storage server, via said storage area network, a second request that causes the second host to change a second MESI of said block of data in a cache associated with said second host; and, supplying, to said first host, by said master storage server, via said storage area network, said block of data and a third MESI state associated with said block of data.

An embodiment of the invention may therefore further comprise a coherent network interface device, comprising: a first interface configured to receive a first block storage command from a host, said first block storage command associated with a first data block; a second interface configured to send said first block storage command to a master storage server via a network, and to receive said first data block data and a first MESI state associated with said first data block from said storage server; a cache memory controller configured to store said first data block data and said first MESI state a cache memory and to retrieve said first data block data from said cache memory in response to a second block storage command and said first MESI state.

DETAILED DESCRIPTION OF THE EMBODIMENTS

Figure 1:
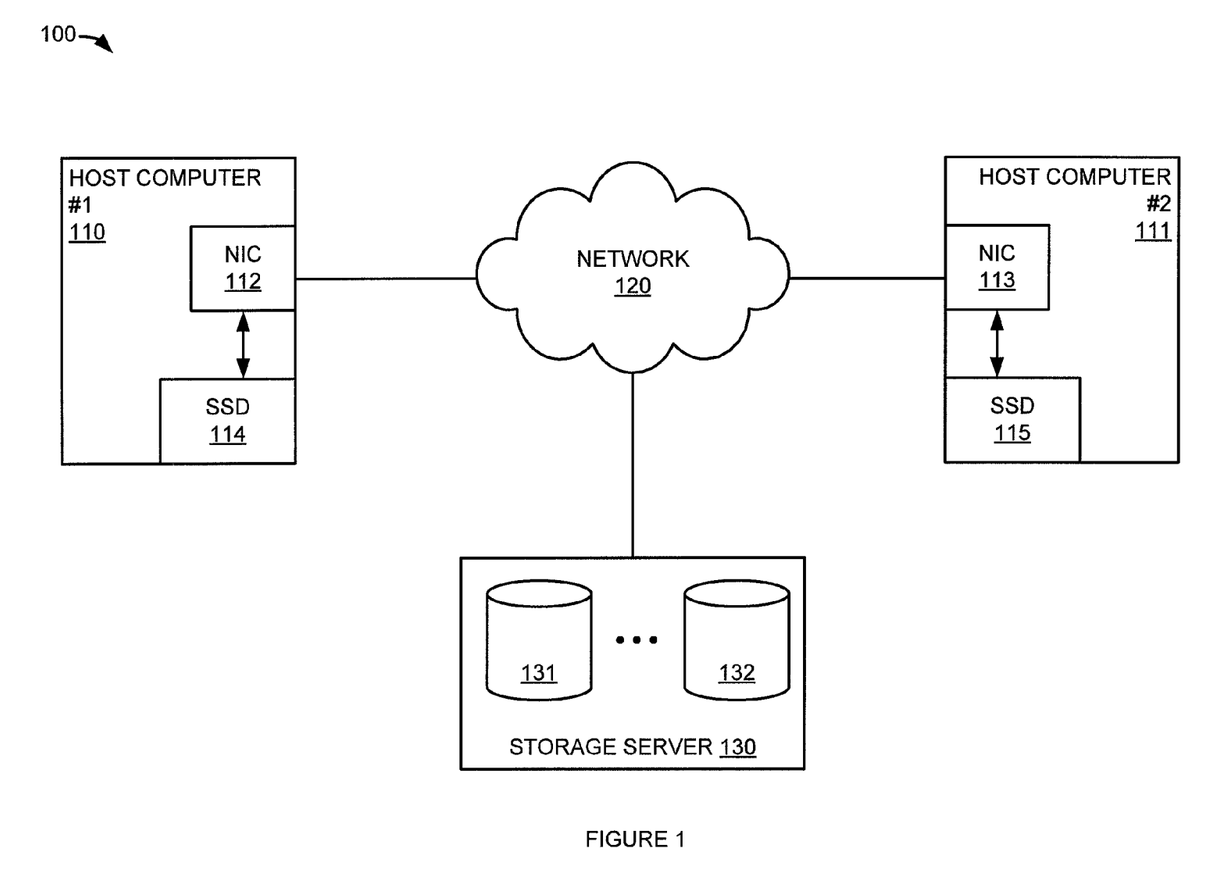
FIG. 1 is a block diagram of a coherent network storage system.

FIG. 1 is a block diagram of a coherent storage system. In FIG. 1, coherent storage system 100 includes host computer #1 110, host computer #2 111, network 120, and storage server 130. Host computer #1 110 includes or is operatively coupled to network interface card (NIC) 112 and solid state disk (SSD) 114. NIC 112 is operatively coupled to SSD 114. NIC 112 is also operatively coupled to network 120. Host computer #2 110 includes or is operatively coupled to NIC 113 and SSD 115. NIC 113 is operatively coupled to SSD 115. NIC 113 is also operatively coupled to network 120. Network 120 is operatively coupled to storage server 130. Storage server 130 includes disk drives 131 and 132. SSD's 114 and 115 may include flash memory.

Network 120 may be any network or collection of networks that couple, link, or otherwise operatively connect host #1 110, host #2 111, and storage server 130, with each other and other devices or systems. Network 120 may include other secondary data networks. In an example, network 120 may include a backhaul network, a local network, a long distance network, a packet network, the interne, or any combination thereof, as well as other types of networks.

In an embodiment, remote storage commands and data destined for storage server 130 via network 120 pass through NICs 112 and 113. NICs 112 and 113 may accelerate and manage the protocols for remote storage access. Typically, these remote storage commands are sent to NICs 112 and 113 via an interface, such as a PCI, or PCI-express (PCIe) interface. The remote storage commands may be sent to storage server 130 via a second interface, such as an Ethernet (or other IP network) interface. The remote storage commands sent to storage server 130 may conform to an Internet Protocol (IP)-based storage networking standard for linking data storage facilities. These standards include iSCSI, fiber channel (FC), and fiber channel over Ethernet (FCoE).

NICs 112 and 113 may duplicate writes (or the data for the write) to storage server 130 and send them to SSD 114 and SSD 115, respectively. NICs 112 and 113 may also intercept subsequent reads of data previously sent to SSDs 114 and 115, respectively, and satisfy the read by retrieving the data from SSD 114 or 115, respectively (and not storage server 130). NICs 112 may organize the data stored on SSD 114 using cache coherency algorithms.

In an embodiment, NICs 112 and 113 and storage server 130 cooperate to implement an extended MESI protocol. In another embodiment, NICs 112 and 113 and storage server 130 cooperate to implement an extended MESI protocol with a master copy of each data kept on storage server 130.

In general, the MESI protocol allows a cache to satisfy a read of data in any state except Invalid. An Invalid data block must be fetched to satisfy a read. When an Invalid data block is fetched, it should be placed in a Shared or Exclusive states. A write to data stored in cache is allowed only if the data is in the Modified or Exclusive state. If it is in the Shared state, all other cached copies must be invalidated first. This is typically done by a broadcast operation known as Read For Ownership (RFO).

The MESI protocol allows a cache to discard non-Modified data at any time. Discarding data is typically done by changing the state of that data to the Invalid state. Before being discarded, a Modified line must first be written back to the master storage location (i.e., storage server 130).

A cache that holds a block of data in the Modified state must snoop (a.k.a., intercept) all attempted reads (from all of the other caches in coherent storage system 100) of the corresponding data block stored in storage server 130 and return the data that it holds when the corresponding block is read. This may be done by forcing the read to back off (i.e. retry later), then writing the data to storage server 130, and then changing the data block to the Shared state.

A cache that holds a block of data in the Shared state must listen for invalidate or read-for-ownership broadcasts from other caches. When one of these is received, the data block should be discarded (by moving it into Invalid state). A cache that holds a data block in the Exclusive state must also snoop all read transactions from all other caches, and move the data block to the Shared state on a read that matches.

It should be understood that the Modified and Exclusive states match the true cache ownership of the data block in the coherent storage system 100. The Exclusive state provides opportunistic optimization: If the CPU wants to modify a data block that is in the shared state, a network 120 transaction is necessary to invalidate all other cached copies. State E enables modifying a data block with no network 120 transaction.

The MESI protocol also allows for a Read For Ownership (RFO) operation. An RFO operation combines a read and an invalidate broadcast. The operation is issued by a NIC 112 or 113 trying to write a data block into SSD 114 or 115, respectively, that is not exclusive or not modified to itself (i.e., that is in the shared (S) or invalid (I) states of the MESI protocol.) The operation causes all other hosts, and storage server 130, to set the state of such data block to Invalid. A read for ownership transaction is a read operation with intent to write to that data block address. Therefore this the RFO operation is exclusive. It brings a data block to the cache and invalidates all other host caches which hold this data block.

In an embodiment, coherency is maintained across coherent storage system 100. NIC 112 may receive a read from network storage command from host #1 110. In response to this command, NIC 112 may determine whether the data requested by host #1 110 is cached in a second host (e.g., host #2 111) in coherent storage system 100. In an embodiment, NIC 112 may determine whether the data requested by host #1 is cached in a second host using a state associated with the data requested by host #1. For example, NIC 112 may determine that the data requested by host #1 is not cached in a second host because the requested data is marked Exclusive by NIC 112. In another embodiment, NIC 112 may determine that the data requested by host #1 is cached in a second host by issuing a read data command which is snooped by NIC 113. NIC 113 may then return an indicator (e.g., hit, dirty-hit, I got it, etc.) to NIC 112 that informs NIC 112 that the requested data is cached by a second host.

In response to determining that the requested data is cached by a second host, NIC 112 may cause the second host to write the first block of data. For example, the read data command which was snooped by NIC 113 may cause NIC 113 to write the requested data block to storage server 130. NIC 112 may then receive the requested block of data by issuing another read data command to storage server 130. In another example, the read data command which was snooped by NIC 113 may cause NIC 113 to write the requested data block directly to NIC 112 (e.g., by providing the read response that would otherwise be provided by storage server 130 had the requested data block not been cached in SSD 115). This response may also cause storage server 130 to update its copy of the requested data block.

In an embodiment, storage server 130 may also maintain or arbitrate MESI states associated with data blocks. Storage server 130 may receive a request to change the MESI state of a data block. For example, storage server 130 may receive an RFO request from host #1 110. Because storage server 130 may know which caches the data block is stored in, storage server 130 may send a command to the hosts which hold copies of the data block that they must change the state of the data block. For example, storage server 130 may command NIC 113 to change the state of the data block to Shared. In another example, storage server 130 may command NIC 113 to change the state of the data block to invalid, and so on.

Storage server 130 may then return a state of the data block to the first host. For example, if the RFO operation was successful, storage server 130 may return an indicator that allows host #1 to change the status of the requested block to Exclusive. In another example, storage server 130 may return an indicator that requires host #1 to change the status of the requested block to Shared.

Figure 2:
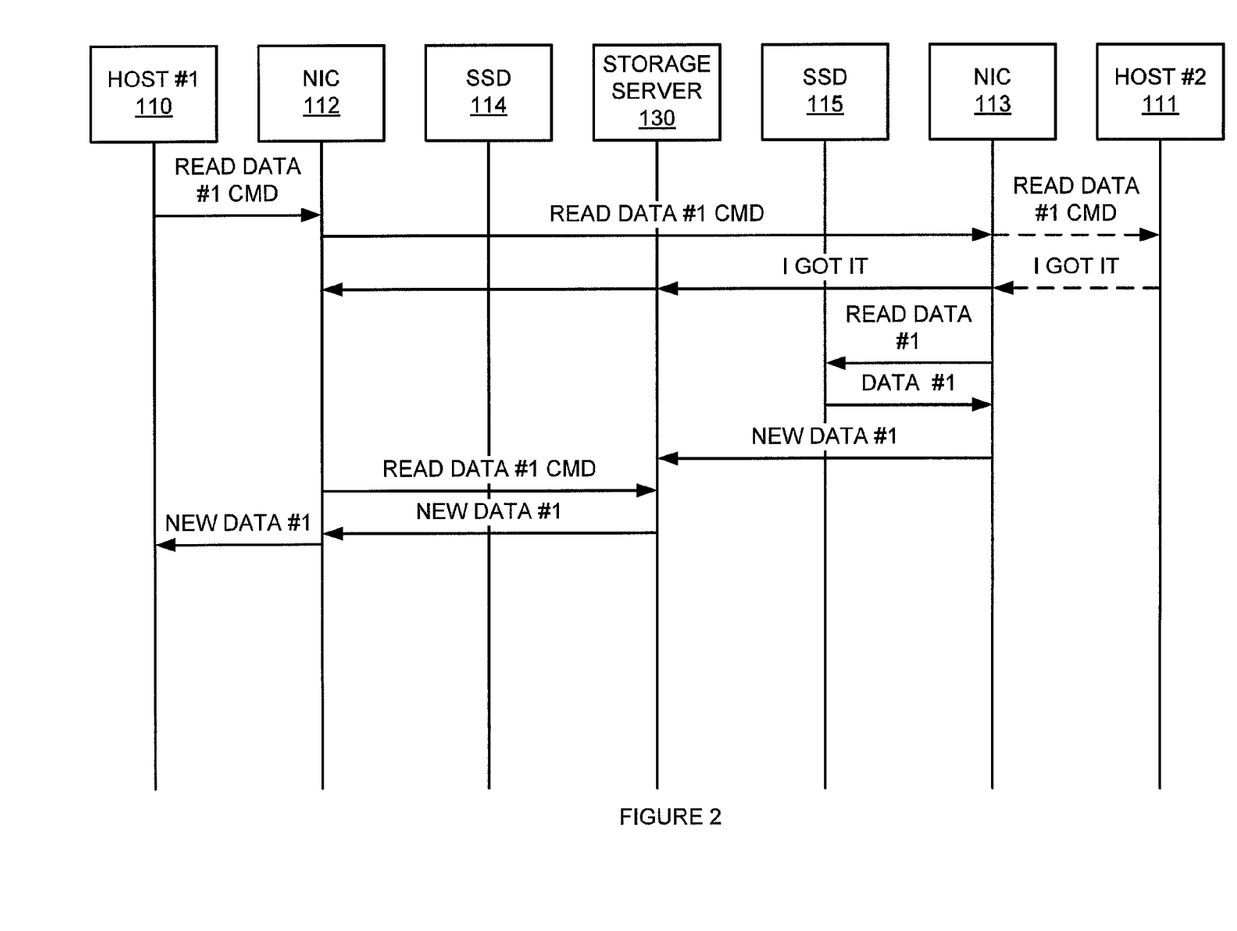
FIG. 2 is a flow diagram of a method of maintaining storage data coherency across a network.

FIG. 2 is a flow diagram of a method of maintaining storage data coherency across a network. The flows and steps illustrated in FIG. 2 may be performed by one or more elements of coherent storage system 100.

Host 110 sends a first remote storage command to NIC 112. For example, host 110 may send a block read command which is routed to NIC 112 by software, hardware, or a combination of the two. This block read command may be interpreted, re-formatted, or converted into another protocol. For example, NIC 112, or its associated driver software may convert the block read command into an iSCSI, FC, or FCoE command. The converted (or unconverted) command may be sent to storage server 130 (not shown) and/or host #2 via NIC 113 and network 120.

In response, NIC 113 (or Host #2 if cache coherency is being maintained in software) returns to NIC 112 and storage server 130 and indication that SSD 115 holds a modified copy of the requested data block. NIC 113 reads the requested block from SSD 115. After receiving the requested data block from SSD 115, NIC 113 sends the modified data block to storage server 130. After storage server 130 has received the modified data block, NIC 112, issues a second read data block command to request the modified data block from storage server 130. In response, storage server 130 sends the modified data block to NIC 112. NIC 112 may forward the modified data to host #1 110 and/or to SSD 114 for cached storage.

Figure 3:
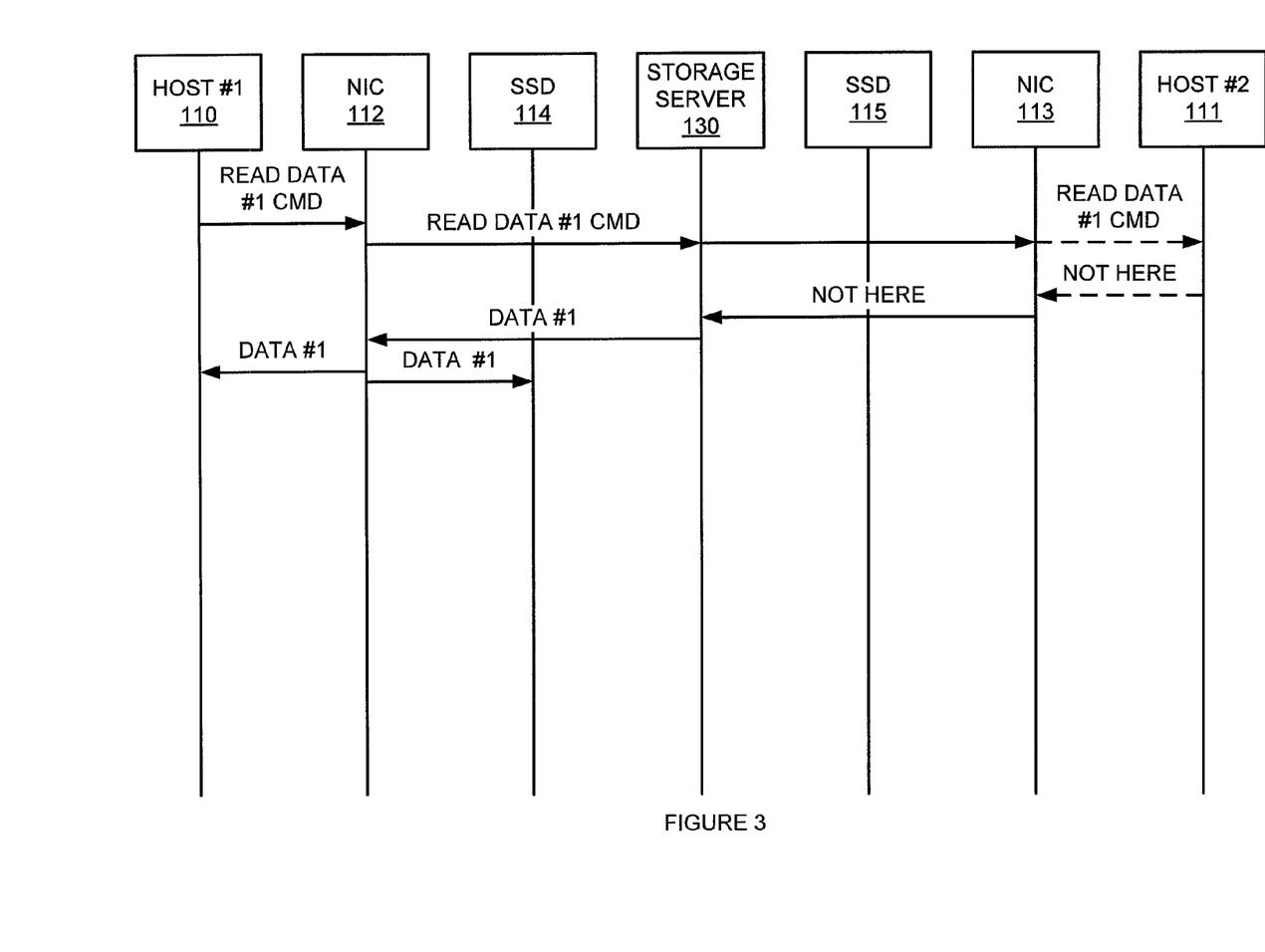
FIG. 3 is a flow diagram of a method of maintaining storage data coherency across a network.

FIG. 3 is a flow diagram of a method of maintaining storage data coherency across a network. The flows and steps illustrated in FIG. 3 may be performed by one or more elements of coherent storage system 100.

Host 110 sends a first remote storage command to NIC 112. NIC 112 forwards the read data command to storage server 130. In particular, NIC 112 forwards the read data command to storage server 130 in cases where it cannot satisfy the read data command using data cached on SSD 114. Storage server 130 sends the read data command to host #2 111 (via NIC 113). Alternatively, NIC 112 may send the read data command directly to NIC 113 and storage server 130 merely snoops that command.

Host #2 determines that it does not hold a modified copy of the requested data and sends an indicator to storage server 130. This indicator informs storage server 130 that it should supply the requested data. In response, storage server 130 send the requested data to NIC 112. NIC 112 may forward the modified data to host #1 110 and/or to SSD 114 for cached storage.

Figure 4:
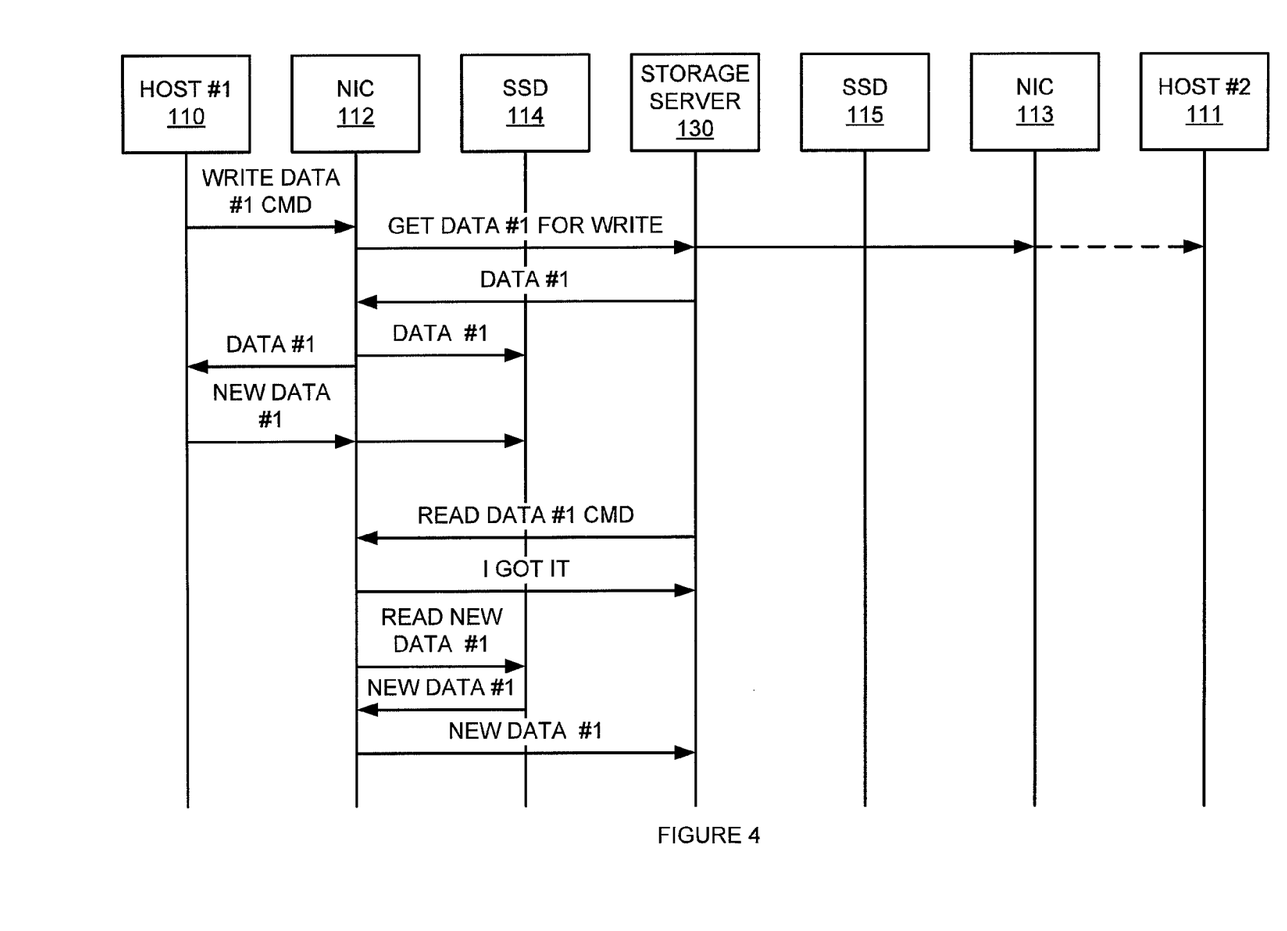
FIG. 4 is a flow diagram of a method of maintaining storage data coherency across a network.

FIG. 4 is a flow diagram of a method of maintaining storage data coherency across a network. The flows and steps illustrated in FIG. 4 may be performed by one or more elements of coherent storage system 100.

Host 110 sends a write data to remote storage command to NIC 112. If NIC 112 determines that it does not have permission to modify the data block (e.g., because it does not associate the Exclusive state with the data block) NIC 112 sends a request to get the data block and permission to write the data block to storage server 130 (i.e., get for write request). In an alternative embodiment, NIC 112 broadcasts a get for write request that is received by both storage server 130 and host #2 111.

In response to the get for write request, storage server 130 returns the requested data, and permission to write it to NIC 112. NIC 112 may forward the data to host #1 110 and/or to SSD 114 for cached storage. Host #1 110 modifies the data and sends it to NIC 112. NIC 112 send the modified data to SSD 114 for cached storage.

Storage server 130 may then, on its own initiative, request the modified data block from host #1. Storage server 130 may do this periodically, or during times of low resource (e.g., network) utilization. In this manner, storage server 130 may maintain up to date copies of data held by SSDs 144 and 115. In response to the read data command of the modified block received from storage server 130, NIC 112 responds with an indicator that it has the modified block. NIC 112 also retrieves the modified block from SSD 114 and sends this new data to storage server 130.

The systems, engines, databases, processors, modules, networks, servers, and functions described above may be implemented with or executed by one or more computer systems. The methods described above may also be stored on a computer readable medium. Many of the elements of storage system 100 may be, comprise, or include computers systems. This includes, but is not limited to, host #1 110, host #2 111, NIC 112, NIC 113, SSD 114, SSD 115, network 120, storage server 130, disk 131, and disk 132.

Figure 5:
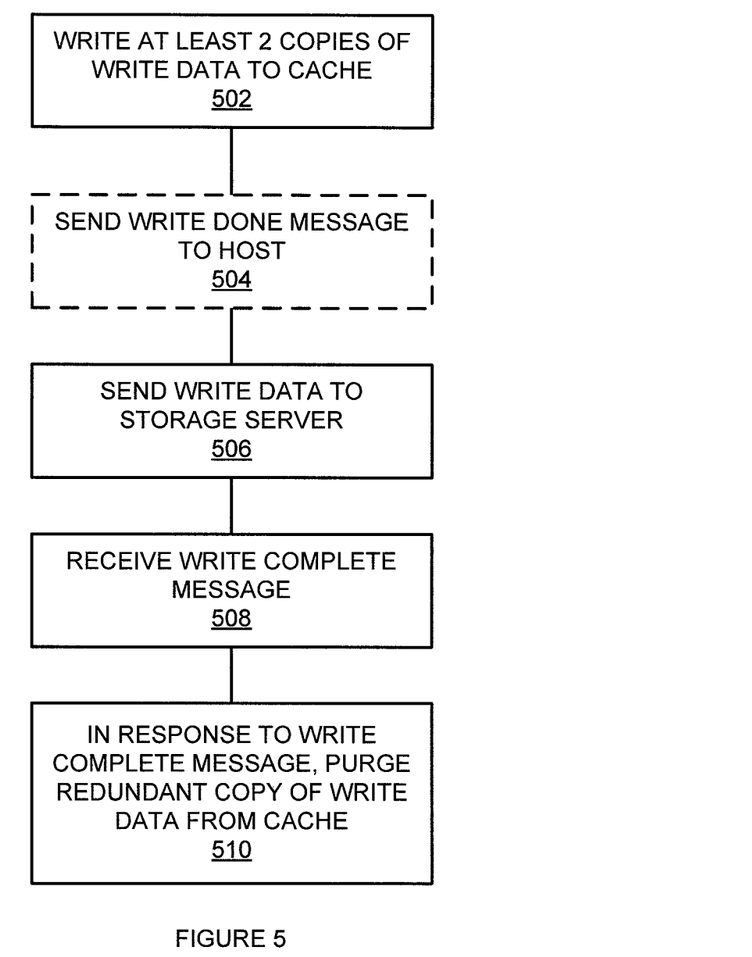
FIG. 5 is a flowchart of a method of operating a coherent storage system.

FIG. 6 is a flowchart of a method of operating a storage system. The steps illustrated in FIG. 6 may be performed by one or more elements of storage system 100. At least two copies of write data are written to a storage cache (502). For example, NIC 112, in response to a write to network storage command received from host 110, may write two copies of the write data to SSD 114. This redundancy is in effect RAID-1 redundancy. In other embodiments, more copies, or more copies with additional error detection and correction may be written. For example, other RAID levels (such as RAID levels 2-6) may be written to SSD 114.

Optionally, a write done message is sent to host (504). For example, before a write done (or write complete) message is received from storage server 130, NIC 112 may send a write done message to host 110. This allows host 110 to continue processing without having to wait for delays attributable to network 120, storage server 130, NIC 111, and/or disk 131.

The write data is sent to another server (506). For example NIC 112 may forward the write data command received from host 110 to storage server 130. In another embodiment, NIC 112, after storing the redundant copies in SSD 114 and optionally sending a write done message to host 110, may send a write data command to storage server 130 with the write data. NIC 112 may perform this task in the background.

In an embodiment, NIC 112 may send the write data to NIC 111 in response to a read data command from host 111. In this case, NIC 111's read request for the write data causes NIC 112 to write the data to NIC 111 (and optionally storage server 130). NIC 112 may perform this task at times when network 120 traffic, host 110, or storage server 130, are not very busy. Because the data is first written into SSD 114, than at a later time written to master storage (i.e., storage server 130) this may be seen as a delayed write commit.

A write complete message is received (508). For example, storage server 130, in response to the write data command sent by NIC 112, may send a write complete message to NIC 112. In another example, NIC 111 may send a write complete message to NIC 112 when it receives the read data it requested. In response to the write complete message, a redundant copy of the write data is purged from the cache (510). For example, NIC 112 may remove a redundant copy of the write data from SSD 114 once it knows that there is another copy stored in storage server 130.

These steps help provide the reliability of RAID protection before a write-through completes. It also helps provide the reliability of RAID protection after the write-through completes because there are still at least two copies of the written data in the system—one in SSD 114 (i.e., the cache), and at least one in master storage (i.e., storage system 130) or another cache (i.e., SSD 115). As discussed above, these steps (and system) may also improve performance because host 110 may continue processing without having to wait for delays attributable to network 120, storage server 130, and/or disks 131 and 132. This continued processing may allow re-ordering of critical reads ahead of the writes to storage system 130 thus improving performance.

Figure 6:
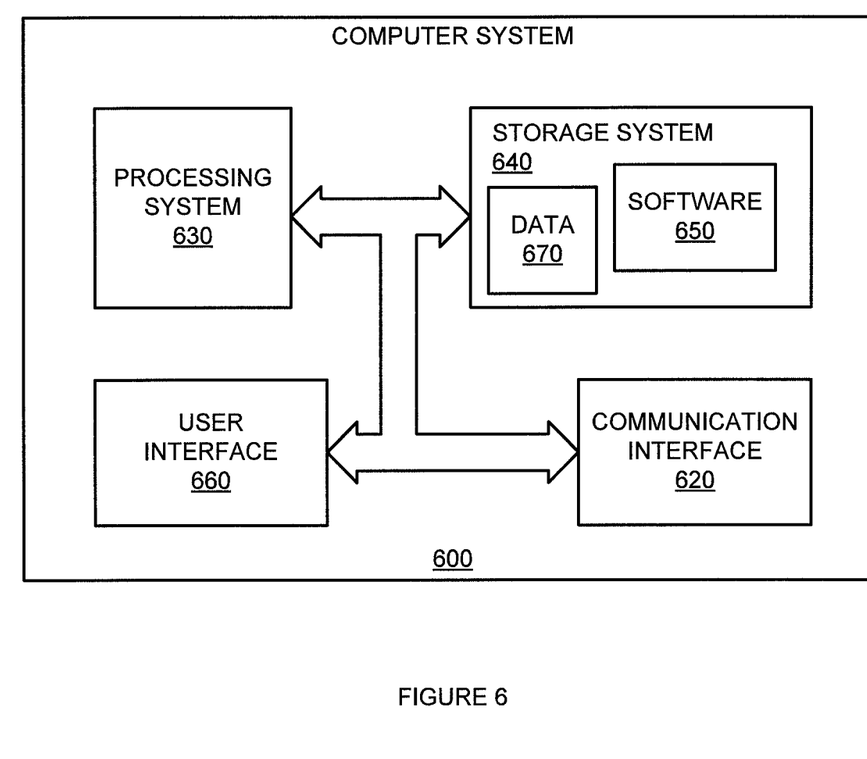
FIG. 6 is a block diagram of a computer system.

FIG. 6 illustrates a block diagram of a computer system. Computer system 600 includes communication interface 620, processing system 630, storage system 640, and user interface 660. Processing system 630 is operatively coupled to storage system 640. Storage system 640 stores software 650 and data 670. Processing system 630 is operatively coupled to communication interface 620 and user interface 660. Computer system 600 may comprise a programmed general-purpose computer. Computer system 600 may include a microprocessor. Computer system 600 may comprise programmable or special purpose circuitry. Computer system 600 may be distributed among multiple devices, processors, storage, and/or interfaces that together comprise elements 620-670.

Communication interface 620 may comprise a network interface, modem, port, bus, link, transceiver, or other communication device. Communication interface 620 may be distributed among multiple communication devices. Processing system 630 may comprise a microprocessor, microcontroller, logic circuit, or other processing device. Processing system 630 may be distributed among multiple processing devices. User interface 660 may comprise a keyboard, mouse, voice recognition interface, microphone and speakers, graphical display, touch screen, or other type of user interface device. User interface 660 may be distributed among multiple interface devices. Storage system 640 may comprise a disk, tape, integrated circuit, RAM, ROM, network storage, server, or other memory function. Storage system 640 may be a computer readable medium. Storage system 640 may be distributed among multiple memory devices.

Processing system 630 retrieves and executes software 650 from storage system 640. Processing system may retrieve and store data 670. Processing system may also retrieve and store data via communication interface 620. Processing system 650 may create or modify software 650 or data 670 to achieve a tangible result. Processing system may control communication interface 620 or user interface 670 to achieve a tangible result. Processing system may retrieve and execute remotely stored software via communication interface 620.

Software 650 and remotely stored software may comprise an operating system, utilities, drivers, networking software, and other software typically executed by a computer system. Software 650 may comprise an application program, applet, firmware, or other form of machine-readable processing instructions typically executed by a computer system. When executed by processing system 630, software 650 or remotely stored software may direct computer system 600 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of maintaining storage data coherency across a network, comprising:
   receiving, from a first host, a first read from network storage command associated with a first block of data stored by a storage server, wherein a second host is operable to cache the first block of data;
   in response to the first read from network storage command, determining whether said first block of data requested by said first read from network storage command is cached by the second host by issuing a data command over an Internet Protocol (IP) network coupling the first host, the second host, and the storage server, wherein the data command is issued from the first host to the storage server without passing through the second host, and wherein the determination is based on the data command being intercepted by the second host;
   in response to determining said first block of data is cached by said second host, causing said second host to write said first block of data; and
   receiving at said first host said first block of data.

2. The method of claim 1, wherein said second host writes said first block of data to the storage server holding a copy of said first block of data.

3. The method of claim 1, wherein said second host writes said first block of data to said first host.

4. The method of claim 1, further comprising:
   storing a master copy of said first data block in the storage server adapted to receive, from said first host, said first read from network storage command associated with said first block of data.

5. The method of claim 1, further comprising:
   updating a master copy of said first data block in the storage server adapted to receive, from said second host, said first block of data written by said second host.

6. The method of claim 1, wherein determining whether said first block of data requested by said first read from network storage command is cached by said second host uses a MESI protocol.

7. A coherent network interface device, comprising:
   a first interface configured to receive a first block storage command from a first host, said first block storage command associated with a first data block;
   a second interface configured to:
      send said first block storage command to a master storage server via an Internet Protocol (IP) network,
      receive said first data block and a first MESI state associated with said first data block from said storage server via the IP network,
      intercept a second block storage command associated with the first data block, wherein the second block storage command is sent from a second host to the master storage server via the IP network without being sent through the coherent network interface device, and
      provide the first data block in response to intercepting the second block storage command;
   a cache memory controller configured to store said first data block and said first MESI state in a cache memory and to retrieve said first data block from said cache memory in response to the second block storage command and said first MESI state.

8. The network interface device of claim 7, wherein said second interface is configured to send iSCSI commands.

9. The network interface device of claim 7, wherein said second interface is configured to send fiber channel (FC) commands.

10. The network interface device of claim 7, wherein said second interface is configured to send fiber channel over Ethernet (FCoE) commands.

11. The network interface device of claim 7, wherein said first interface is configured to receive PCI commands and said second interface is configured to send block storage commands over the interne protocol (IP) network.

12. The network interface device of claim 7, wherein said cache memory controller is further configured to overwrite said first MESI state in said cache memory in response to a command from said master storage server.

13. The network interface device of claim 7, wherein the second interface is further operable to provide the first data block to the second host in response to intercepting the second block storage command.

14. The network interface device of claim 7, wherein the second interface is further operable to provide the first data block to the master storage server in response to intercepting the second block storage command.

15. A method comprising:
   receiving, by a network interface device of a first host, a first data command for a block of data stored by a storage server;
   retrieving, by the first host, the block of data in response to the first data command;

caching the block of data in a memory cache of the first host;

intercepting by the first host, a second data command for the block of data, wherein the second data command is sent by a second host to the storage server via an Internet Protocol (IP) network, wherein the Internet Protocol (IP) network transmits the data command from the second host to the storage server without passing through the first host, and wherein the second host is different from the first host; and providing, by the first host, an indicator of a cache status of the block of data in the memory cache of the first host in response to the second data command.

16. The method of claim 15, wherein the providing of the indicator of the cache status includes providing the block of data for writing to the second host.

17. The method of claim 15, wherein the providing of the indicator of the cache status includes providing the block of data for writing to the storage server.

* * * * *